United States Patent [19]

Hirata et al.

[11] 4,257,693
[45] Mar. 24, 1981

[54] CINE CAMERA

[75] Inventors: Noritsugu Hirata, Yokohama; Hiroyuki Takimoto, Urawa, both of Japan

[73] Assignee: Canon Kabushiki Kaisha, Tokyo, Japan

[21] Appl. No.: 10,397

[22] Filed: Feb. 8, 1979

[30] Foreign Application Priority Data

Feb. 14, 1978 [JP] Japan .................................. 53-15527

[51] Int. Cl.³ .......................... G03B 9/12; G01D 5/36
[52] U.S. Cl. .............................. 352/209; 250/231 SE; 352/216
[58] Field of Search .............................. 352/208–209, 352/214, 216–217, 141; 250/231 SE

[56] References Cited

U.S. PATENT DOCUMENTS

| 2,764,056 | 9/1956 | Kennedy | 352/209 |
| 3,787,116 | 1/1974 | Shimizu | 352/216 X |
| 4,074,128 | 2/1978 | Harris, Jr. et al. | 250/231 SE X |

FOREIGN PATENT DOCUMENTS 1092826  11/1967  United Kingdom ..................... 352/208

Primary Examiner—L. T. Hix
Assistant Examiner—Thomas H. Tarcza
Attorney, Agent, or Firm—Toren, McGeady and Stanger

[57] ABSTRACT

The present invention is to provide a cine camera in which the exposure time is accurately maintained by detecting the time during which the film is actually exposed and, upon occurrence of a difference of this detected value from the set value, by varying the shutter open angle to compensate the exposure time.

2 Claims, 9 Drawing Figures

CINE CAMERA

FIELD OF THE INVENTION

This invention relates to cine cameras.

BACKGROUND OF THE INVENTION

It is already known to provide a cine camera either with a shutter open angle varying device where the rotary shutter is constructed from a plurality of shutter blades to obtain an arbitrary shutter open angle, or with a shutter open angle varying device where the shutter open angle is discretely changed over, for example, to 150°, 216° or the like. However, these conventional cine cameras are unable sometimes to attain a desired shutter open angle even though the operator believes he has set the shutter open angle variation setting means to the desired angle, because a manufacturing error between the shutter open angle varing device and the shutter open angle variation setting device exists. Further the desired shutter open angle is not always able to be obtained due to the back lash existing between the various mechanical components. The shutter open angle varying device in the conventional cine camera also employs a so-called "open loop" control system where there is provided no means of detecting the afore-said error and of compensating that error, so that the influence of this photographic error on photography becomes serious particularly when an object to be photographed, for example, a television picture, necessitates an accurate exposure time. In other words, in taking photographs of television pictures whose vertical synchronizing signal is 60 Hz and horizontal synchronizing signal is 15750 Hz, as the interlacing scanning is employed, the exposure time of $1/60 \times 2 = 1/30$ second must be accurately obtained for each film frame. Also, if the exposure time of the camera is longer than 1/30 second, the scanning lines in a television picture expose the surface of a frame twice in a portion, and therefore the twice-exposed portion of the film frame leads to over-exposure with the result that stripes are recorded along with the picture image. Conversely, when the exposure time of the camera is shorter than 1/30 second, an under-exposed portion due to the lack of scanning lines results in a black stripe formed within the image. These white stripes and black stripes of the image projection screen give to the viewer an extremely unnatural impression. Therefore, in application of the camera to television picture photography, it is required to control the exposure time of each frame with high accuracy for a constant value of 1/30 second as mentioned above. The determinative factors of exposure time in taking pictures may be expressed as:

(1) The average frame frequency when the film is transported;

(2) The shutter open angle; and (3) The rate of variation of shutter rotation speed existing in every one frame exposure operation.

Now assuming that the frame frequency is constant at 18 frames/second, then the shutter open angle $\theta$ necessary to obtain an exposure time of 1/30 second is determined from the equation $1/18 \times \theta/360 = 1/30$ to be $\theta = 216°$. In other words, when the film is transported at a constant frame frequency of 18 frames/second, a television picture can be suitably photographed by adjusting the shutter open angle $\theta$ to 216°.

SUMMARY OF THE PRESENT INVENTION

The present invention has for an object the provision of a cine camera with a shutter open angle variation control device adapted for use in photography requiring an accurate exposure time in each film frame as in taking television pictures. This device employs a reference time signal generator, exposure time detecting means, desired exposure time setting means and a driving device responsive to the difference of the output of the afore-said exposure time detecting means from the desired exposure time setting input for controlling the shutter open angle independently of the film transporting mechanism, whereby a closed loop control system is established to eliminate the error due to the various parts of the afore-said shutter open angle varying device so that it is possible to always obtain a constant exposure time (for example, 1/30 second).

In the following, one embodiment of a cine camera according to the present invention will be explained by the use of drawings.

BRIEF DESCRIPTION OF THE DRAWINGS

FIGS. 3a and 3b are electrical circuit diagrams showing the details of the blocks of FIG. 2.

DESCRIPTION OF THE PREFERRED EMBODIMENTS

Figure 1A:
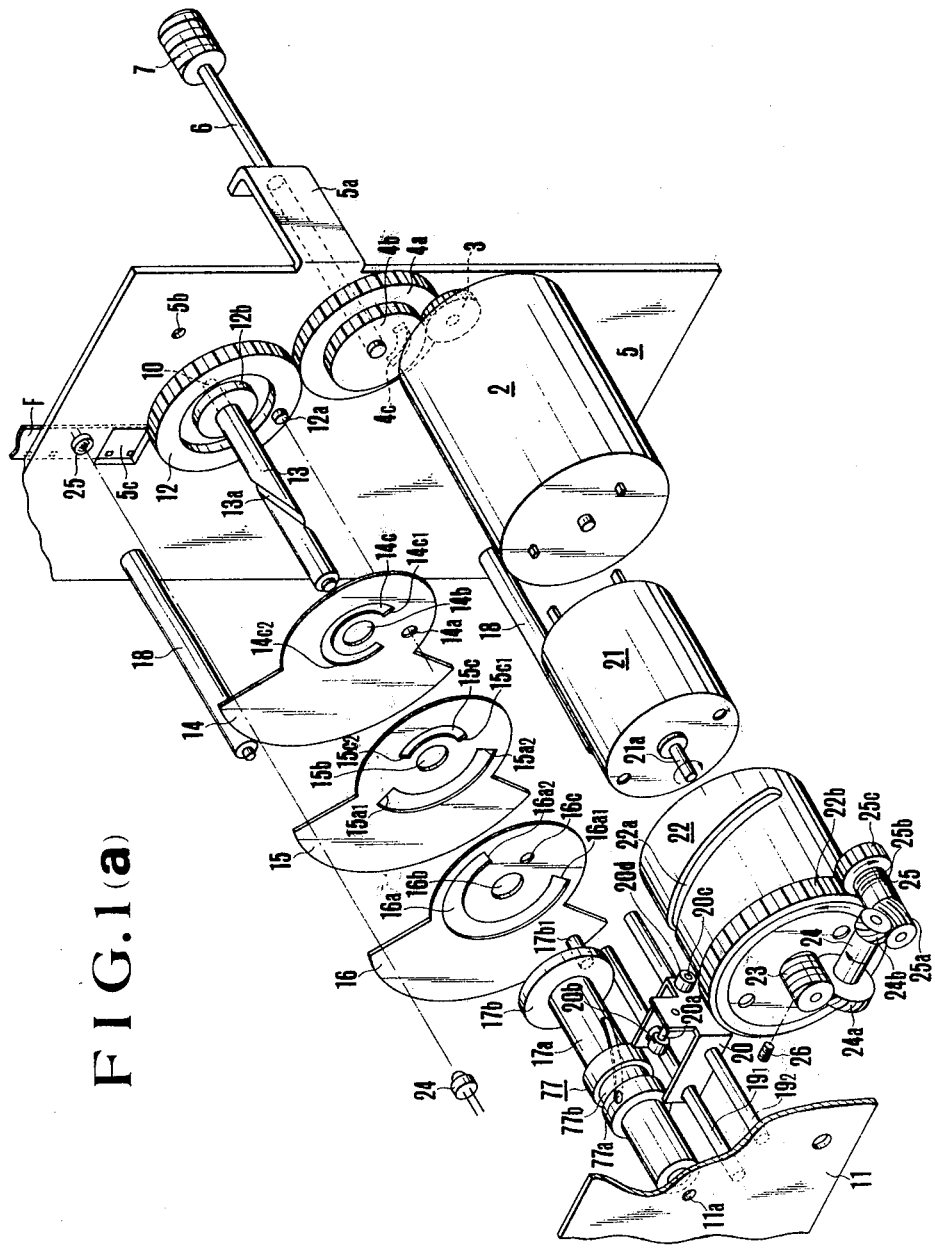
FIG. 1(a) is an exploded perspective view showing a shutter open angle varying device in a cine camera of the present invention.

In FIG 1(a), 5 is a support plate fixedly mounted in a camera housing; 11 is a support plate arranged in an opposite position of the support plate 5. These support plates 5 and 11 are arranged in a predetermined spatial relation to each other by the length of spacer member 18 whose one ends are fixed to the support plate 5, and whose opposite ends are fixed to the support plate 11. Thus, the support plates 5 and 11 are in rigidly secured relation to each other.

2 is the reversible motor for driving a film F fixedly mounted on the camera body; 3 is a gear fixed to a rotary shaft 2a of the motor 2; 4 is a two-staged gear fixedly mounted on a rotary shaft 6 which is journaled in a bent-off holding portion 5a formed in the afore-the support plate 5, said two-staged gear 4 being formed in unison from gears 4a and 4b, and an engagement groove 4c provided on one side of the gear 4a, and the gear 4b of said two-staged gear 4 always meshing with the gear 3; 7 is a worm gear fixedly mounted on the shaft 6; 10 is a shutter main axle, the shutter main axle being journaled at its one end in a hole 5b formed in said support plate 5 and at its opposite end in a hole 11a formed in the afore-said support plate 11. Thus, the afore-said main axle 10 is rotatably supported by the said support plates 5 and 11. 12 is a shutter gear fixedly mounted on the above mentioned shutter main axle 10, the shutter gear 12 being formed to the same number of gear teeth as that of teeth of the gear 4a of the above mentioned two-staged gear 4, and the gear 12 and gear 4a always meshing with each other. Therefore, the above mentioned rotary shaft 6 and shutter main axle 10 are rotated in a relation of 1:1. The above mentioned shutter gear 12 is provided with a projection pin 12a and a circumferential groove 12b on one side plane thereof. In addition thereto, though not shown in the figure, fixedly mounted on the opposite side plane of said one side plane is a cam means for controlling the operation of a film intermittently advancing mechanism of known construction in the art for intermittently advancing the film F. The cam means is constructed to control the film intermittently advancing mechanism so as to transport the film F through the length of one frame during the time when the above mentioned gear 12 completes one revolution. 13 is a first shutter blade control cam sleeve fixedly mounted on the shutter main axle 10, the cam sleeve 13 being formed with a cam groove 13a; 17 is a second shutter blade control cam sleeve fitted on the external surface of the above mentioned cam sleeve 13, the cam sleeve 17 being provided with a cam groove 17a of helical shape having a lead angle of opposite direction to that of the angle of the cam groove 17a, and with a flange portion 17b at the end portion thereof facing against the above mentioned shutter gear 12, and the flanged portion 17b having a projection pin $17b_1$. Again, the second cam sleeve 17 is rotatable independently of the above mentioned first cam sleeve 13 on the cam sleeve 13. 14, 15, 16 are shutter blades constituting an open angle variable shutter, the shutter blades 14, 15, 16 each being formed in a shutter open angle of 220°, and having central open holes 14b, 15b and 16b through which the above mentioned first cam sleeve 13 extends. The shutter blade 14 is provided with a hole 14a for the pin 12a on the gear 12 to pass therethrough and with an arcuately elongated slot 14c for engagement with the pin $17b_1$ on the second cam sleeve 17; the shutter blade 15 is provided with an arcuately elongated slot 15a for engagement with the pin 12a on the gear 12 and another arcuately elongated slot 15c for engagement with the pin $17b_1$ on the above mentioned second cam sleeve 17; and the shutter blade 16 is provided with an arcuately elongated slot 16a for engagement with the pin 12a on the gear 12 and a hole 16c for the pin $17b_1$ on the above mentioned second cam sleeve 17 to pass therethrough. 77 is a slidingly movable ring fitted on the second cam sleeve 17. On the external surface of said sliding ring 77, there is formed a circumferential groove 77b, and on the internal surface there is provided a projection pin 77a extending through the cam groove 13a of the above mentioned second cam sleeve 17 into the cam groove 13a of the above mentioned first cam sleeve 13. This sliding ring 77 enables the first cam sleeve 13, the second cam sleeve 17 and the shutter blades 14, 15, and 16 to be rotated in unison when the shutter main axle 10 is rotated. When the sliding ring 77 is slidingly moved in an axial direction of the second cam sleeve 17, the above mentioned second cam sleeve 17 is rotated relative to the above mentioned first cam sleeve 13, thereby the shutter open angle defined by the above mentioned three shutter blades 14, 15, and 16 is made variable. With the projection pin 77a of the sliding ring 77 positioned at the left ends of the cam grooves 13a and 17a of the first and second cam sleeve 13 and 17 as shown in FIG. 1 (a), the projection pin $17b_1$ of the above mentioned second cam sleeve 17 passing through the hole 16c of the shutter blade 16 abuts against the shutter blade 15 at one end wall $15c_1$ of the elongated slot 15c and also against the shutter blade 14 at the end wall $14c_1$ of the elongated slot 14c. On the other hand, the projection pin 12a of the above mentioned shutter gear 12 passing through the hole 14a of the shutter blade 14 abuts against the shutter blade 15 at the end wall $15a_2$ of the elongated slot 15a, and also against the shutter blade 16 at the end wall $16a_1$ of the elongated slot 16a. Thus, these three shutter blades 14, 15 and 16 overlap one another to assure the full open state (the shutter open angle of about 220°) of the shutter.

As the sliding ring 17 is slidingly displaced on the right as viewed in FIG. 1(a), the action of the projection pin 77a of the sliding ring 77 on the cam groove 13a of the first cam sleeve 13 and the cam groove 17a of the second cam groove 17 causes the second cam sleeve 17 to be rotatably displaced in a counterclockwise direction relative to the first cam sleeve 13. As the second cam sleeve 17 is rotated in the counterclockwise direction, the pin $17b_1$ of the second cam sleeve 17 while driving the shutter blade 16 to rotate in a counterclockwise direction moves in the elongated slot 14c of the shutter blade 14 to progressively narrow the shutter open angle defined by the shutter blades 14 and 16. During this operation, the shutter blade 15 is caused to follow up the shutter blade 16 of the frictional force between the shutter blades 15 and 16 while being rotated relative to the shutter blade 14, until the end wall $15a_1$ of the elongated slot 15a of the shutter blade 15 contacts with the projection pin 12a of the shutter gear 12.

Figure 1B:
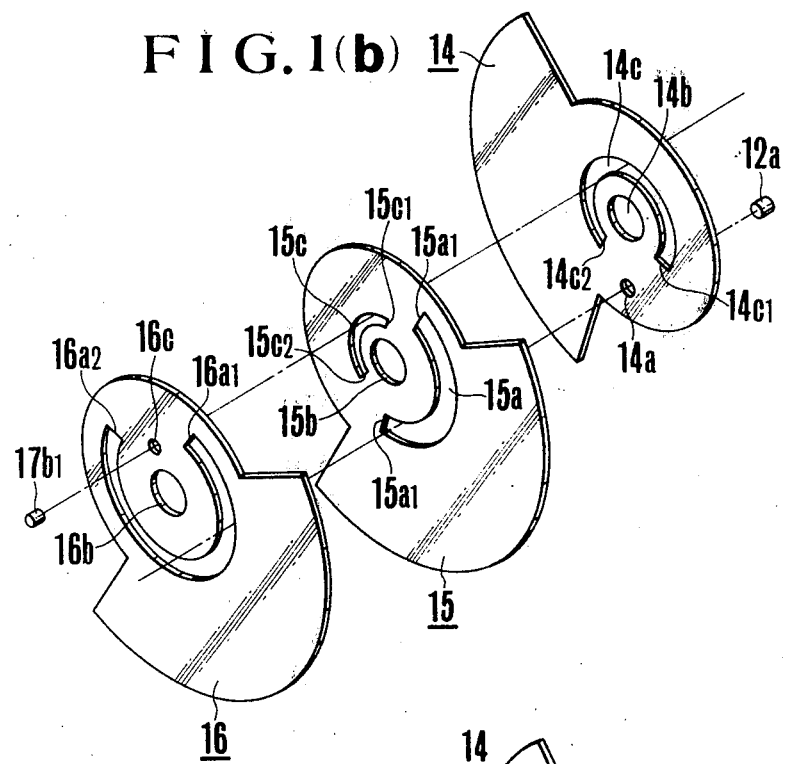
FIGS. 1(b) and 1(c) shows a perspective view of just the shutter blades in different conditions of operation.
Figure 1C:
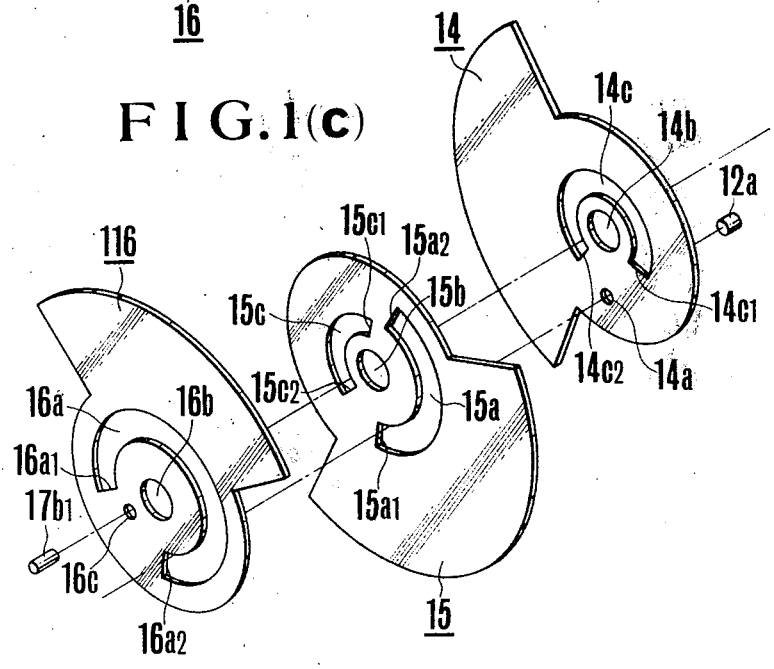

And, in this state of the shutter blade 15 with the end wall $15a_1$ of the elongated slot 15a thereof contacting with the projection pin 12a, the shutter open angle formed by the shutter blades 14, 15 and 16 becomes about 140°, as shown in FIG. 1(b). Upon further counterclockwise rotation of the above mentioned second cam sleeve 17, the pin $17b_1$ of the second cam sleeve 17 moves in guidance by the slots 14c and 15c of the shutter blades 14 and 15, causing only the shutter blades 16 to be rotated and finally reaching a state where the shutter constructed from the shutter blades 14, 15 and 16 is entirely closed (the shutter open angle is zero). In this state, the pin 77a of the sliding ring 77 assumes the right ends of the cam grooves 13a and 17a in FIG. 1(a), while the pin $17b_1$ of the second cam 17 contacts with the end walls 15cand $14c_2$ of the slots 15c and 14c of the shutter blades 15 and 14, and the pin 12a of the shutter gear 12 also contacts with the end walls $15a_1$ and $16a_2$ of the slots 15a and 16a of the shutter blades 15 and 16 as shown in FIG. 1(c). In order to gradually open the shutter from this entirely closed state, the sliding ring 77 has to be slidingly moved in the opposite direction to the above. In other words, as the sliding ring 77 is gradually moved to the left direction of the second cam sleeve 17, the second cam sleeve 17 is rotatably displaced in a clockwise direction relative to the above mentioned first cam sleeve 17. When this second cam sleeve 17 is rotated in the clockwise direction, the shutter blade 16 and shutter blade 15 are simultaneously rotated in the clockwise direction relative to the shutter blade 14. In this manner, the shutter open angle is extended.

When the sliding ring 77 completes the leftward movement at a position shown in FIG. 1(a), the shutter is fully opened again. $19_1$ and $19_2$ are guide rods extending in parallel to the above mentioned shutter main axle 10 and having ends fixed to the support plate 5 and opposite ends fixed to the support plate 11; 20 is a sliding member held by the guide rods $19_1$ and $19_2$, the sliding member 20 is made slidable on said guide rods $19_1$ and $19_2$; $20a$ is a projection pin extending into a groove $77b$ of the above mentioned sliding ring 77, the projection pin $20a$ being fixedly mounted on the sliding member 20; $20b$ is a roller provided on the tip portion of the projection pin $20a$, that is, the portion projecting into the groove $77b$ of the sliding ring 77, thus the projection pin $20a$ and the groove $17b$ being engaged with each other through the roller $20b$; $20c$ is a projection pin fixed to the sliding member 20; $20d$ is roller provided on the projection pin $20c$; 21 is a reversible shutter open angle variation control motor, the motor 21 being fixedly mounted on the support plate 5; 22 is a drag-cup type shutter open angle variation control cam ring arranged so as to cover the motor 21, the cam ring 22 is being rotatably mounted on the rotary shaft $21a$ of the motor 21, and the cam ring 22 being provided with a cam groove $22a$ engaging with the projection pin $20c$ through the roller $20d$ and with a gear $22b$ and switch control grooves $22c_1$ and $22c_2$.

23 is a worm gear fastened to the rotary shaft $21a$ of the motor 21 by a screw 26; $24a$ is a bevel gear fixedly mounted on one end of a rotary shaft 24 which is journaled in the camera body 1, the gear $24a$ always meshing with the gear 23; $24b$ is a bevel gear fixedly mounted on the opposite end of the rotary shaft 24; $25a$ is a worm gear fixedly mounted on one end of a rotary shaft 25 which is journaled in the camera body 1, the gear $25a$ always meshing with the gear $24b$.

$25c$ is a gear rotatably mounted on the opposite end of the rotary shaft 25, the gear $25c$ being rotated by receiving the torque of the rotary shaft 25 through a friction spring $25b$ arranged on the rotary shaft 25 when the above mentioned rotary shaft 25 is rotated, and the gear $25c$ and gear $22b$ being in an always meshing relation. These gears 23, $24a$, $24b$, $25a$, $25b$ and $22b$ constitute a speed reduction mechanism through which the rotation of the motor 21 is transmitted to the cam ring 22. In this manner, the cam ring 22 is driven to rotate by the motor 21. When the cam ring 22 is rotated, the sliding member 20 whose projection pin $20c$ engages in the cam groove $22a$ of the cam ring 22 through the roller $20d$ is slidingly moved on the above mentioned guide rods $19_1$ and $19_2$ as is guided by the above mentioned cam groove $22a$, and when the sliding member 20 is slidingly moved on the above mentioned guide rods $19_1$ and $19_2$, the projection pin $20a$ moves the above mentioned sliding ring 77 on the above mentioned second cam sleeve 17 through the roller $20b$, causing the above mentioned shutter open angle to be varied.

24 is, for example, a light-emitting element such as an LED; 25 is a transistor for receiving light emitted from the light-emitting element 24, these light-emitting element 24 and light-receiving transistor 25 forming a photo-coupler. The photo-coupler is arranged in the neighbourhood of an aperture $5c$ of the support plate so that when the above mentioned shutter blades 14, 15 and 16 cover the aperture $5c$, a space between the light-emitting element 24 and the light-receiving transistor 25 is interrupted by said blades and an OFF signal is produced. When the shutter is opened and light from the light-emitting element 24 is incident upon the light-receiving transistor 25, an ON signal is produced.

Figure 2:
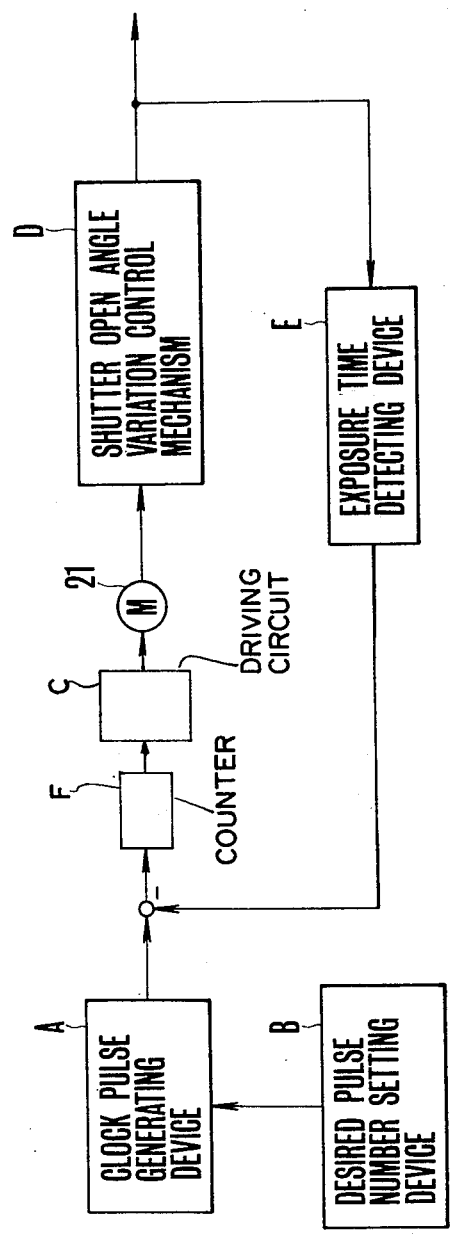
FIG. 2 is a block diagram of a control system for controlling the shutter open angle varying device of FIG. 1.

FIG. 2 is a block diagram of a control system for controlling the shutter open angle varying device of the cine camera according to the present invention. A is a clock pulse generating device; B is a desired pulse number setting device for changing a clock pulse number per unity time produced from the clock pulse generating device A to a desired pulse number corresponding to either of the vertical and horizontal synchronizing signals of different condition, the changing over operation of the desired pulse number setting device B being performed by operation from the outside of the camera; C is a driving circuit; 21 is a motor corresponding to FIG. 1; D is the shutter open angle variation control mechanism of which the details are shown in FIG. 1; E is the exposure time detecting device being composed of the light-emitting element 24 and the light-receiving transistor 25 shown in FIG. 1; and F is a counter.

Figure 3A:
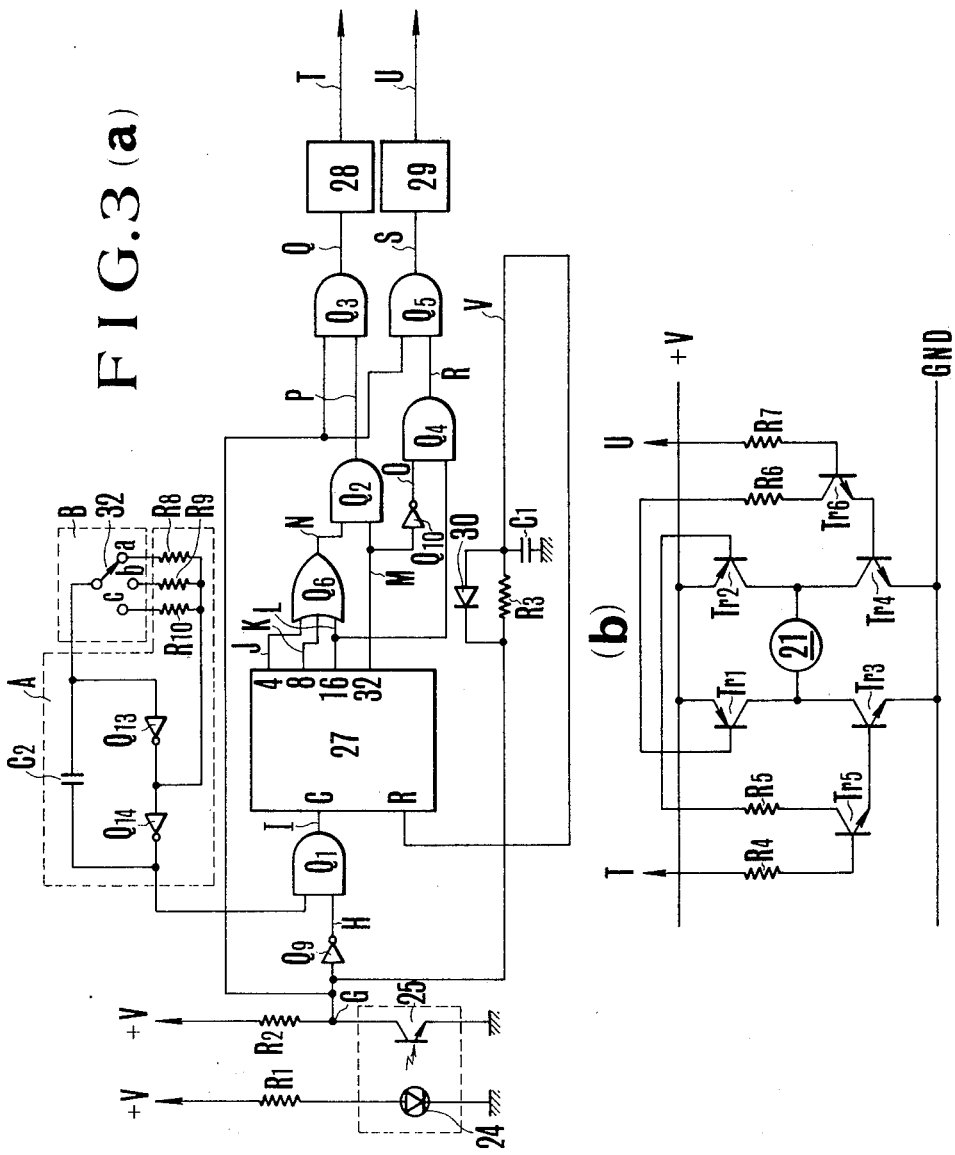

The electrical circuitry of this block diagram of FIG. 2 is shown in greater detail in FIG. 3, where $Q_1$ to $Q_5$ are AND gates circuits, and these AND gates using C-MOS ICs available from RCA Co., (under the trade name CD4081), and Motorola Inc. (under the trade name MC14081); $Q_6$ is a three-input OR gate circuit, said OR gate circuit $Q_6$ using, for example, a C-MOS IC available from RCA (trade name: CD4072), and Motorola Inc. (trade name : MC14072); $Q_9$, $Q_{10}$, $Q_{13}$ and $Q_{14}$ are inverters, these inverter circuits $Q_9$, $Q_{10}$, $Q_{13}$ and $Q_{14}$ using C-MOS ICs available, for example, from RCA (trade name: CD4049, CD4069) and Motorola Inc. (Trade name: MC14049, MC14069).

27 is a counter, this counter being a binary counter for using, for example, C-MOS IC available from RCA (trade name: CD4040) and for Motorola Inc. (trade name: MC14040). $R_1$ to $R_{10}$ are resistors; $C_1$ and $C_2$ are condensers; $Tr_1$ to $Tr_6$ are transistors; 30 is a diode; 32 is a switch. The above mentioned condenser $C_2$, inverter circuit $Q_{13}$ and $Q_{14}$, and the resistors $R_8$ to $R_{10}$ constitute a clock generating device A, and the switch 32 constitutes the desired clock number setting device B. The above mentioned switch 32 is operable from the outside of the camera, and upon short-circuiting to any one of terminals a, b and c, changes over the resistors $R_8$ to $R_{10}$ in the clock pulse generating device A, so that the pulse number produced from said clock generating device is controlled. For example, when the terminal a is short-circuited, the clock pulse generating device A produces clock pulses of 1000 Hz; when the terminal b is short-circuited, clock pulses of 1300 Hz are produced; and when the terminal c is short-circuited, clock pulses of 1500 Hz are produced from the pulse generating device A. The above mentioned light-receiving transistor 25 is rendered conducting by receiving light from the light-emitting element 24 when the aperture $5c$ is not covered by the shutter blades 14, 15 and 16. When the film F is not exposed, in other words, when the shutter blades 14, 15 and 16 cover the aperture $5c$ to shut out light from the light-emitting element 24, the transistor 25 is rendered non-conducting. 28 and 29 are mono-stable multi-vibrators both of which are triggered by leading pulses, the mono-stable multi-vibrator 28 being triggered when the shutter open angle is so large that the exposure time is longer than the desired value, and its output point T being at a high level potential for a predetermined time interval, while the other mono-stable multi-vibrator 29 is triggered when the shutter open angle is so small that the exposure time is shorter than the desired value, the output point U being at a potential of high level for a predetermined time interval. These mono-stable multi-vibrators 28 and 29 both are not triggered when the exposure time is equal to the set value. The above mentioned transistors $Tr_1$ to $Tr_6$, and registors $R_4$ to $R_7$ constitute a drive circuit for rotating the motor 21 in either of forward or reverse directions. When the output portion T of the above mentioned mono-stable multi-vibrator 28 becomes high level, the transistor Tr$_2$, Tr$_3$ and Tr$_5$ are turned on, the transistors Tr$_1$, Tr$_4$ and Tr$_6$ are turned off, causing the motor 21 to be rotated in a direction (clockwise direction) indicated by an arrow in FIG. 1 so as to narrow the shutter open angle through the shutter open angle varying device. Conversely when the output portion U of the mono-stable multi-vibrator 29 becomes a high level, the transistors Tr$_2$, Tr$_3$ and Tr$_5$ are turned on, and the transistors Tr$_1$, Tr$_4$ and Tr$_6$ are turned on, causing the motor 21 to be rotated in the reverse direction (counter-clockwise direction) to that of the arrow of FIG. 1, and therefore causing the shutter open angle varying device to be driven so as to widen the shutter open angle. Again, when the output portions T and U of the mono-stable multi-vibrators 28 and 29 are at the low level simultaneously, the drive circuit stops the motor 21. The above mentioned condenser C$_1$, diode 30 and register R$_5$ constitute a delay circuit. The delay circuit functions to reset the counter 27 after a predetermined time from the completion of the exposure. Also, the time during which the output portions T and U of the above mentioned mono-stable multi-vibrator 28 or 29 is maintained at the high level is determined to be a suitable length by taking into account the inertia of the mechanism (23–25) for transmission of the rotation of the motor 21 to the shutter blade open angle varying mechanism (22, 20, 19, 77, 17), and the characteristics of the motor 21 itself. In this embodiment of the invention, this time length is such that once the output of the mono-stable multi-vibrator 28 or 29 becomes high level, the open angle is changed by about 1° to 2°.

Figure 4A:
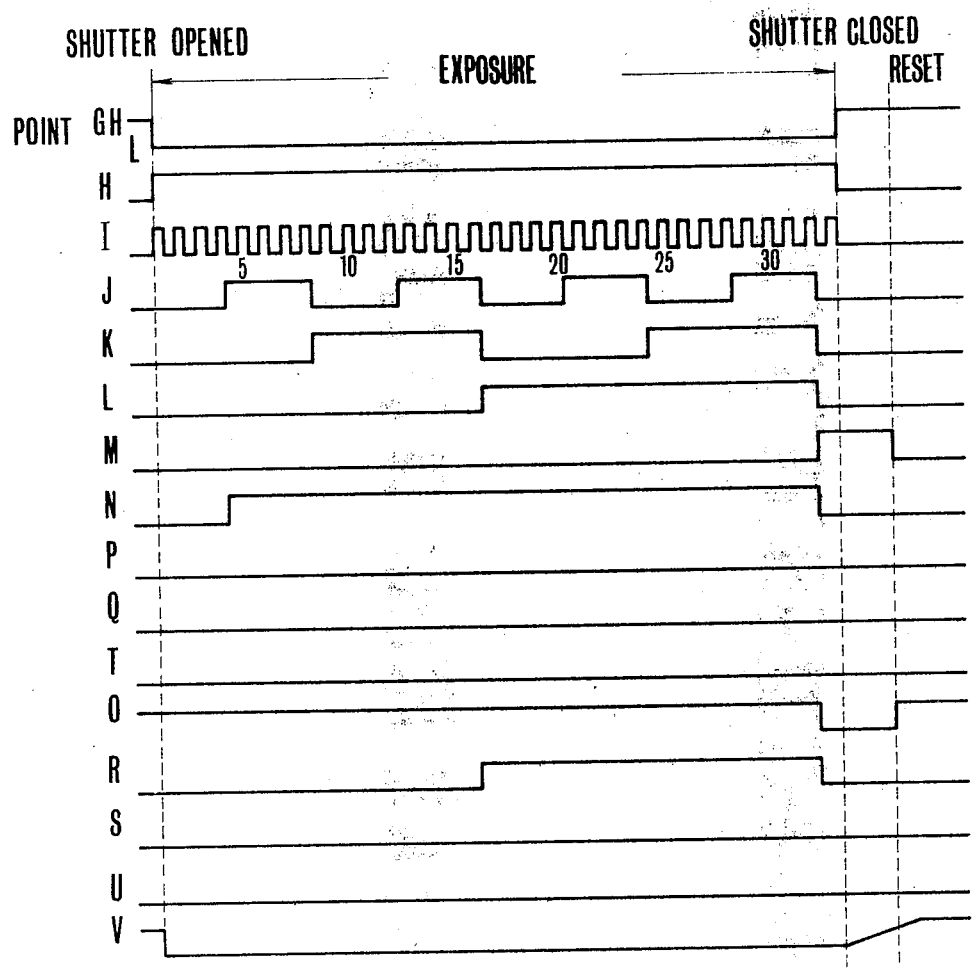
FIGS. 4a, 4b and 4c shows timing charts of the camera shown in FIGS. 1 to 3.
Figure 4B:
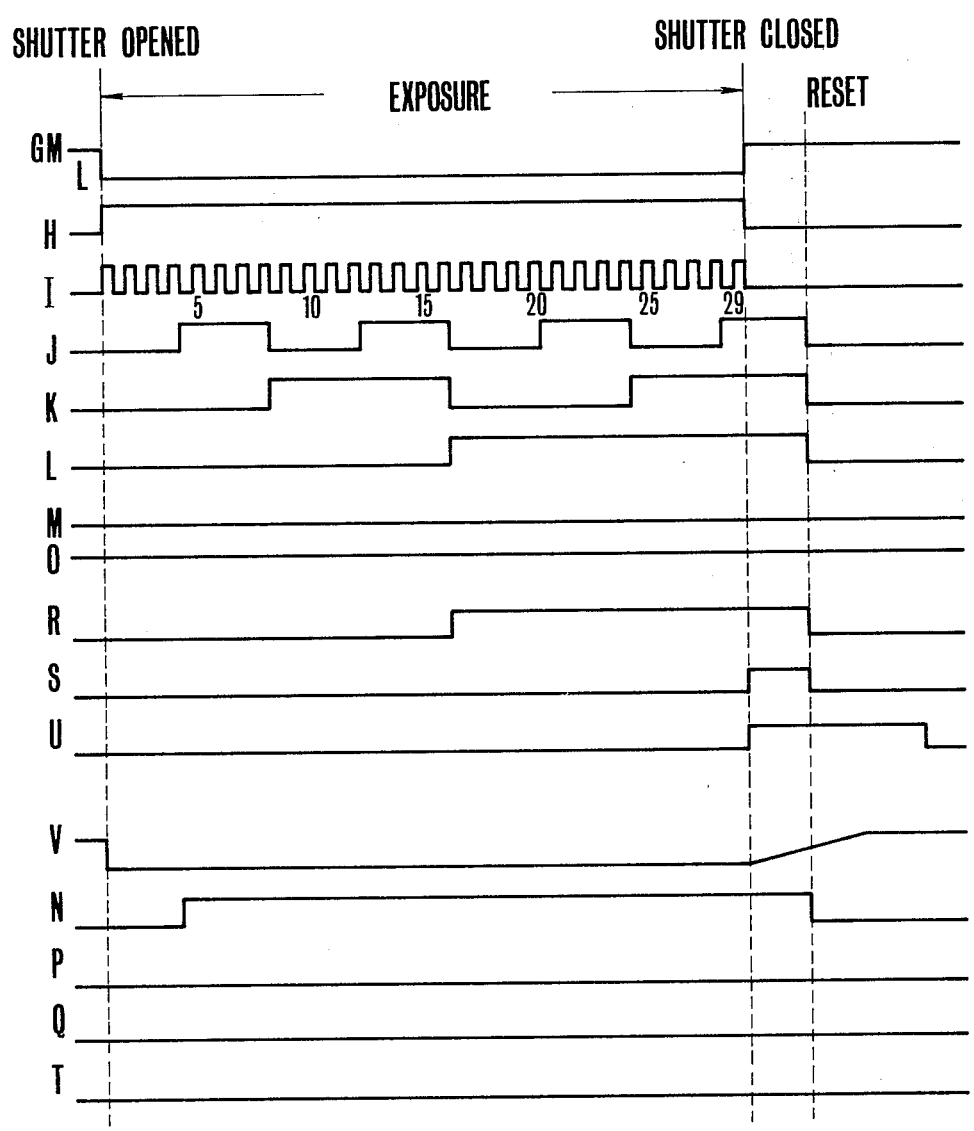
Figure 4C:
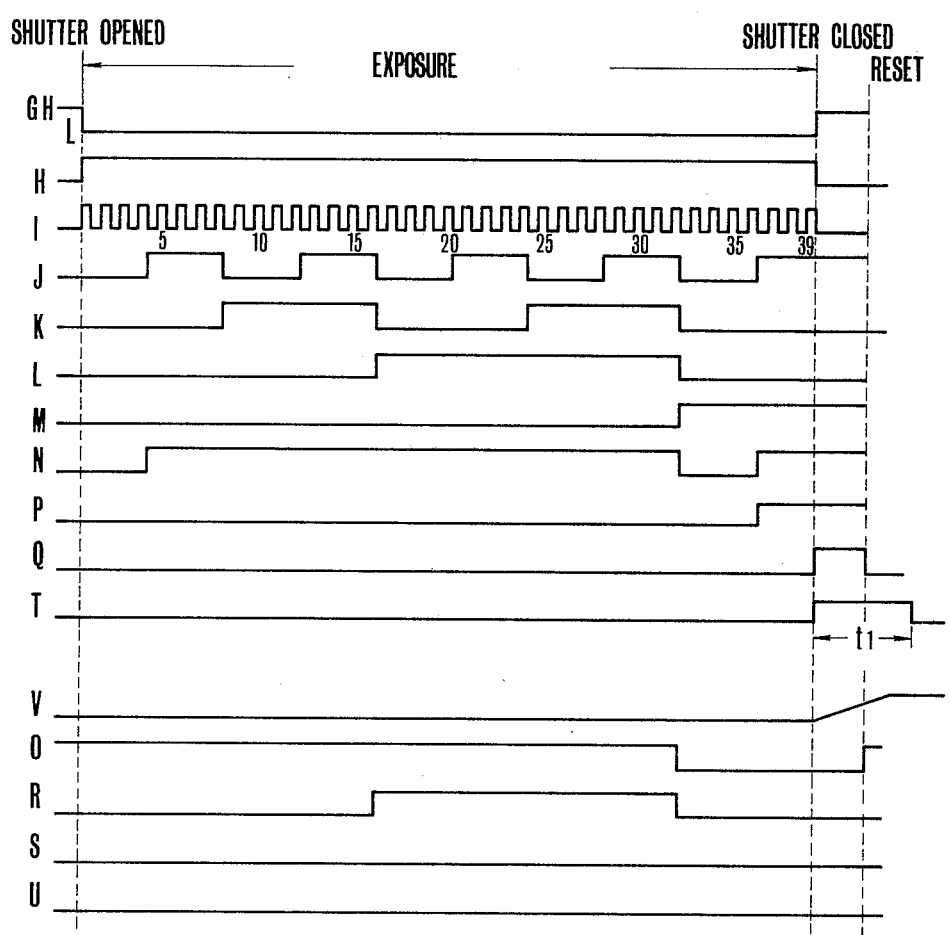

FIG. 4 shows timing charts of the camera shown in FIGS. 1 to 3, with FIG. 4(a) showing the timing chart of the case where the shutter open angle is almost equal to the desired one, and therefore, the exposure time approximately coincides with the desired ideal value, FIG. 4(b) showing a timing chart of the case where the shutter open angle is narrower than the desired one, and the exposure time is shorter than the target value, and FIG. 4(c) showing a timing chart of the case where the shutter open angle is wider than the desired one, and the exposure time is longer than the target value.

With reference to this FIG. 4 along with FIGS. 1 to 3, the operation of the cine camera of the invention will be explained below.

At first, an explanation is given in the case where the shutter open angle is almost equal to the desired open angle, and the shutter time is almost equal to the target value. The timing chart of this case is shown in FIG. 4(a).

Now let the shutter blades 14, 15 and 16 cover the aperture 5c to make no exposure of the film F, then light from the light-emitting element 24 is not incident upon the light-receiving transistor 25, and therefore the transistor 25 is in the non-conducting state. In this state, the level of a point G is high, and the level of a point H is low. Therefore, though the switch 32 is short-circuited to the terminal, a, to cause production of clock pulses of 1000 Hz from the clock pulse generator A, the AND gate Q$_1$ is closed so that the level of a point I remains unchanged from the low level, and the other circuit portions remain in the reset states also. Next, when the shutter blades 14, 15, 16 move to a position where the aperture 5c is uncovered to initiate an exposure of the film F, light from the light-emitting element 24 is incident on the light-receiving transistor 25, and the light-receiving transistor 25 is rendered conducting.

Such conduction of the light-receiving transistor 25 causes the level of G point to change to the low level, and the level of H point to the high level, thereby the charge on the condenser C$_1$ is discharged, and the AND gate Q$_1$ is opened to apply the clock pulses of 1000 Hz to the counter 27. In a time interval between 32nd and 35th pulses applied to the counter 127, the shutter blades 14, 15 and 16 cover again the aperture 5c to terminate the exposure of the film F. Since the mono-stable multi-vibrators 28 and 29 both are not triggered, the motor 21 is not driven, and the shutter open angle is held in the initial state. When the shutter is closed, the light-receiving transistor 25 is rendered non-conducting again, causing the level of G point to become high. When charging of the condenser C$_1$ is completed, the level of a point V becomes high to reset the counter 27. During the time when the shutter blades close the aperture 5c, the film F is advanced one frame, and then the next frame exposure operation starts. When the level of G point becomes low again, the condenser C$_1$ starts to be discharged with the level of V point becoming low. Again applied to the counter 27 are clock pulses from the clock pulse generator A. If the shutter blades 14, 15 and 16 cover the aperture 5c before the 31st pulse as shown in FIG. 4(b), (this state occurs when the shutter open angle is narrower than the desired open angle, or when the speed of rotation of the shutter is too fast to obtain the aimed exposure time), the output level of S point becomes high to trigger the mono-stable multi-vibrator 29, causing the motor 21 to rotate in the clockwise direction and therefore causing the shutter open angle to be widened by 1 to 2 degrees. After this triggering of the mult-vibrator 29, the counter 27 is reset. Further, the light-receiving transistor 25 is covered to change the level of G point to the high level so that charging of the condenser C$_1$ is performed. When charging of the condenser C$_1$ is completed, the level of V point becomes high to apply a resetting signal to the counter 27. Since the counter 27 is already reset at the time of the triggering of the mono-stable multi-vibrator 28, there is no room to reset the counter 27 again. Therefore, by the above mentioned operation, the shutter open angle is widened by 1° to 2°, and this corrected shutter open angle contributes to the next frame exposure. In other words, when the next frame exposure is initiated, the level of the G point is again changed to the low level at which the condenser C$_1$ starts to be charged with the level of V point becoming low. Again applied to the counter 27 are clock pulses from the clock pulse generator A. If the shutter open angle adjusted in the preceding frame exposure is excessively widened with respect to the predetermined open angle, and therefore the aperture 5c is covered after more than 36 pulses have been counted as shown in FIG. 4(c), the level of the point Q becomes high to trigger the mono-stable multi-vibrator 28, causing the motor 21 to be rotated in the counterclockwise direction and therefore causing the shutter open angle to be narrowed by 1° to 2°. After this triggering of the mono-stable multi-vibrator 28, the counter 27 is reset. Again, the level of the G point becomes high due to the covering of the aperture 5c, and charging of the condenser C$_1$ is performed. When the charging of the condenser C$_1$ is completed, the level of V point becomes high to produce a resetting signal for the counter 27. But, since the counter 27 is already reset after the triggering of the mono-stable multi-vibrator 28, the counterr 27 is not required to be reset again. Therefore, the above mentioned operation results in a decrease of the shutter open angle by 1 to 2 degrees, and this corrected shutter open anger contributes to the next frame exposure.

In other words, such procedure repeats itself so that the exposure time is held at the set value of exposure time.

As has been explained above, the cine camera according to the present invention has a reference time signal generator (clock pulse generator), exposure time detecting means, and means for setting an aimed exposure time, whereby upon detection of a deviated output of the above mentioned exposure time detecting means relative to the aimed exposure time input, the shutter open angle varying mechanism is controlled in accordance with the deviated output amount to maintain the constant exposure time. Thus, it is made possible to obtain a cine camera suitable for use in taking motion pictures requiring an accurate exposure time in each frame of film as in the case of the taking of television pictures.

What is claimed is:
1. A cine camera comprising a rotary shutter having a plurality of shutter blades, a shutter open angle varying device, means for setting an exposure time, time signal forming means for producing a reference time signal corresponding to the time set by said exposure means, means for producing a signal corresponding to the opening and closing of the shutter, a detecting circuit receptive of said time signal and said shutter opening and closing signal for detecting the exposure time of the shutter, and driving means responsive to the output of said detecting circuit for driving said shutter open angle varying device.

2. A cine camera according to claim 1, wherein said means for producing a signal corresponding to the said shutter opening and closing includes a light-emitting element and a photo-electric transducer for receiving light from said light-emitting element when the shutter blades opens the aperture for exposure.

* * * * *